March 7, 1944.    H. E. SOMES    2,343,336
METHOD OF HEATING BORINGS PRIOR TO MELTING
Original Filed Aug. 9, 1937    2 Sheets—Sheet 1

INVENTOR
Howard E. Somes
BY John P. Tarbox
ATTORNEY

March 7, 1944. H. E. SOMES 2,343,336
METHOD OF HEATING BORINGS PRIOR TO MELTING
Original Filed Aug. 9, 1937 2 Sheets-Sheet 2

INVENTOR
Howard E. Somes
BY John P. Tarbox
ATTORNEY

Patented Mar. 7, 1944

2,343,336

UNITED STATES PATENT OFFICE 2,343,336

METHOD OF HEATING BORINGS PRIOR TO MELTING

Howard E. Somes, Detroit, Mich., assignor to Budd Wheel Company, Philadelphia, Pa., a corporation of Pennsylvania Original application August 9, 1937, Serial No. 158,009. Divided and this application December 23, 1940, Serial No. 371,354

7 Claims. (Cl. 75—65)

The present invention relates in general to the making of iron for castings and more particularly to a process of producing pig iron or molten iron for castings.

The main object of the invention is the provision of a process of producing molten iron or pig iron for castings from cast iron borings or short steel turnings.

By the term "borings" is meant especially the short turnings produced during the boring or machining of cast iron or other metal. Such borings may be and usually are of the wet type, wetted with the cutting compounds used in the machining, which compounds may consist of water and water-soluble oil or other cutting oils not mixed with water. The condition of the borings on delivery to the foundry may be such as to carry 50 pounds of water per gross ton of borings and from 20 to 30 pounds of cutting oils per gross ton.

Heretofore, cast iron borings have been converted into molten iron after removal of water and oil as by centrifuging and then briquetting, after which the briquettes were charged together with other material into a cupola furnace, or charged without the use of other material directly into an electric furnace of either the indirect arc or induction type.

In the use of the indirect arc furnace, it is customary to continuously oscillate or rock the furnace through about 170 to 200 degrees to cause the molten metal to wash the walls of the furnace to protect them from becoming heated to an undesirably high temperature. The furnace is usually provided with a removable door and fixed pouring spout. According to the known method of using such a furnace for the melting of borings, the furnace must be first pre-heated then charged through the removable door with enough borings to bring the level of the borings up to the level for which the furnace is designed to hold metal. The arc is then turned on and the borings melted down. After this melting is completed, an additional charge of borings is added and the melting operation repeated. If, for example, the holding capacity of the furnace should be 10,000 pounds, it would be desirable to melt up to 10,000 pounds of borings without pouring from the bath. With sufficient metal melted to reach the upper bath level and brought to the desired pouring temperature, the metal would then be poured from a fixed spout into a suitable ladle. The pouring would be continued to approximately within 3,000 pounds of the contents of the furnace. Into the remaining 3,000 pounds of molten metal fresh borings would be supplied and melted down as before.

It will be seen from the above that such operation is of an intermittent nature consisting of loading, melting, and pouring intervals during which latter intervals the arc is discontinued. It is also to be noted that in order to charge the furnace, the arc must be discontinued and the door must be removed, and after charging is completed, the door must be replaced, the arc turned on, and the furnace periodically rocked first through a narrow angle and gradually to a greater angle as the charge permits. As indicated above, it has also been necessary to remove the undesirable water and oil as by centrifuging, before charging, inasmuch as any water remaining in the charge must be converted into steam and discharged as steam through the spout while any oil remaining in the charge would have to be volatilized. Both the water vapor and the oil have an undesirable effect on the refractory linings of the furnace. Oxygen produced as a result of the breaking down of the water vapor by the high temperature arc is productive of oxidation of the carbon or graphite electrodes and thereby productive of undesirable electrode consumption, which in the known practice, under such conditions, has been found to be very substantially in excess of that required for the treatment of dry metal.

According to the known art, a similar procedure would be used with a furnace of the direct arc type, the essential difference in operation being that the direct arc furnace might have a removable top permitting a top charge, and might have a hydraulic nose tilt permitting rapid pouring of the metal from the molten bath.

The object of the present invention in general is to overcome the above difficulties and to provide an improved and highly economical and efficient process for the reduction of metal borings of the type above mentioned.

According to the present invention, the borings as they come to the foundry in the wet condition are freed of the oil and water, superheated and passed on into an arc furnace of the indirect or direct type through a novel coordinated arrangement of treating and handling elements in a substantially continuous process.

My improved process and suitable apparatus for carrying out the same is disclosed in detail in the following specification and accompanying drawings.

Figure 3 is a diagrammatic top plan view showing use of a furnace of the direct arc type for carrying out my process.

Figure 4 is a diagrammatic view in the form of a section taken on the line 4—4 of Figure 3.

Figure 1:
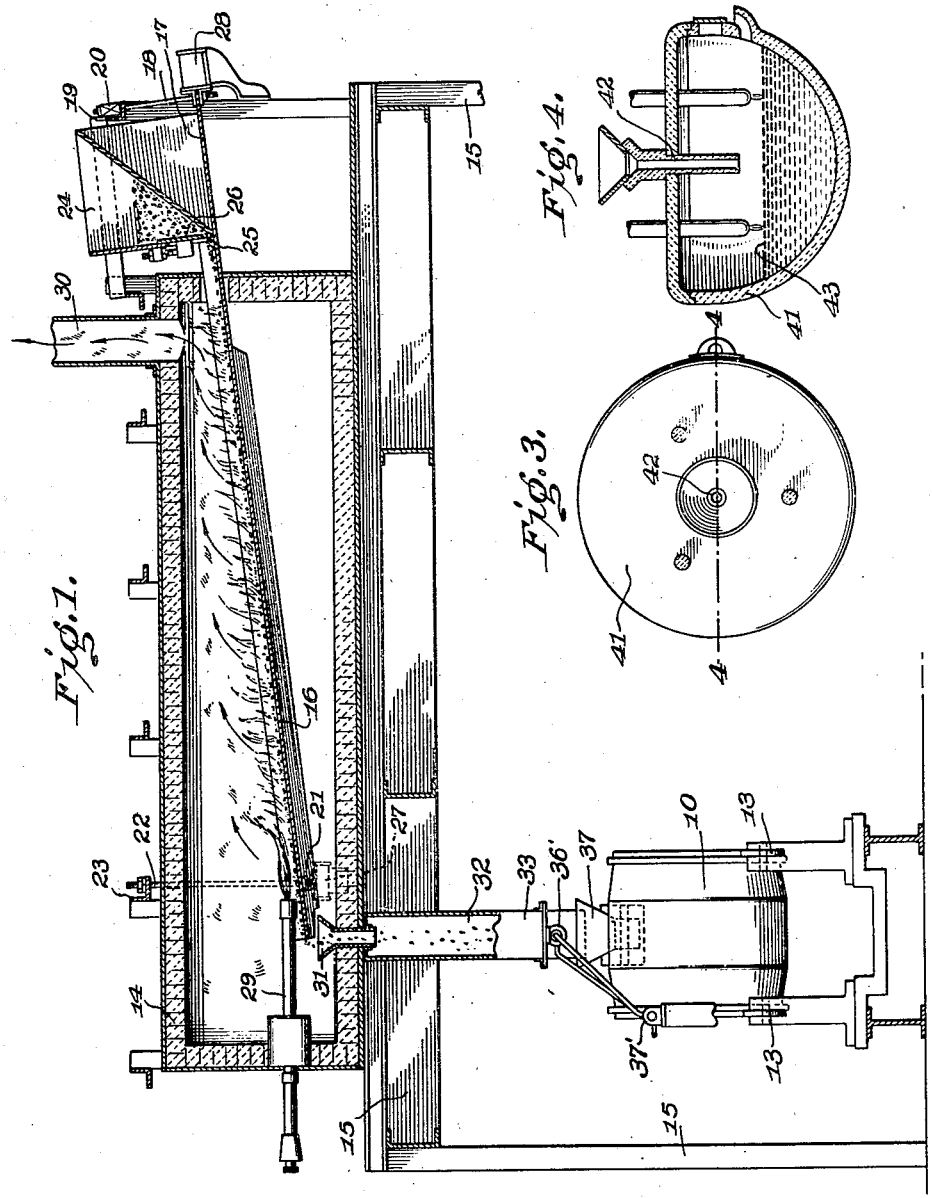
Figure 1 is a side elevation partly in section illustrating a preferred form of apparatus.
Figure 2:
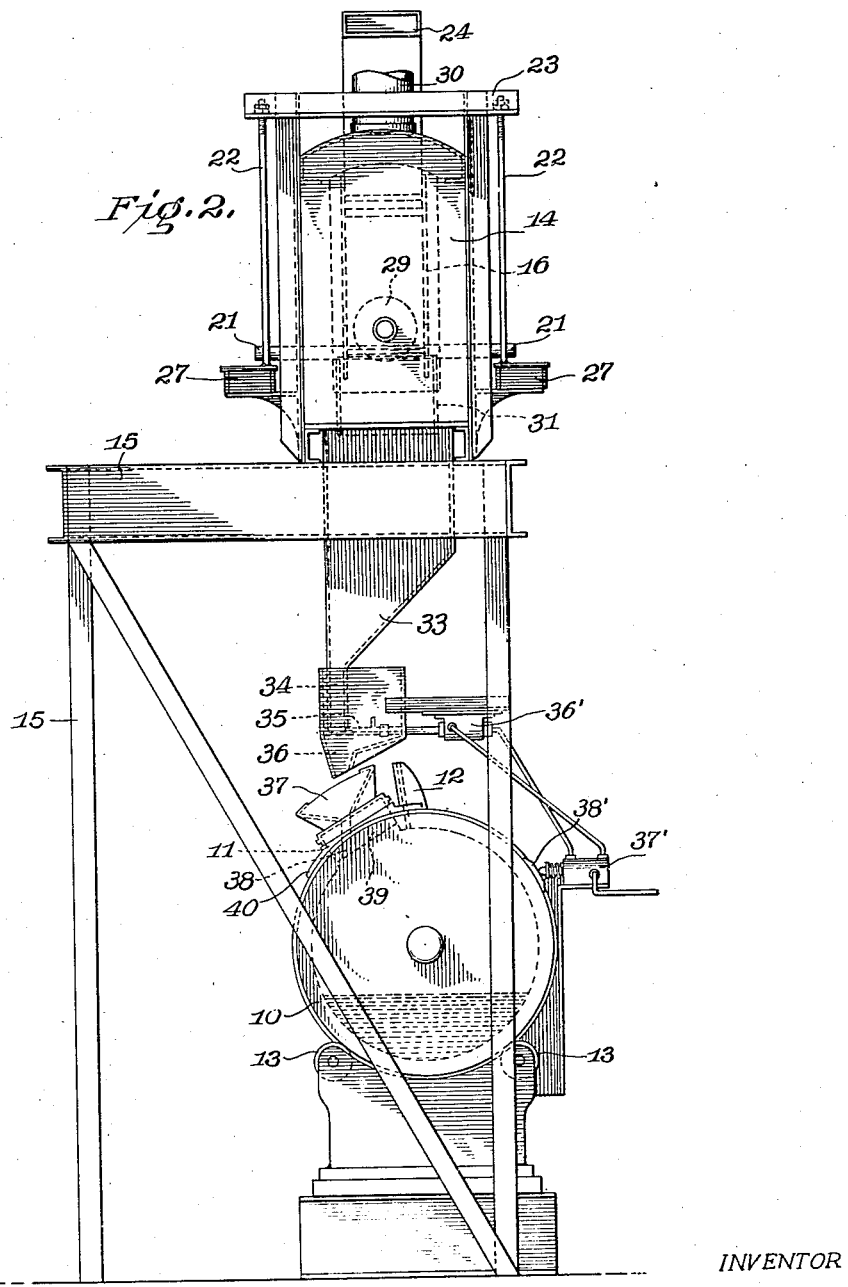
Figure 2 is an end elevation of the lefthand end of Figure 1.

Referring to the drawings in detail and first to Figures 1 and 2, the melting furnace here shown at 10 is of the indirect arc type having the usual pouring spout 12 and the usual arrangement permitting it to be rocked as indicated by the roller supports 13, but provided with a novel form of door or feed opening 11 with integral hopper and a feeding slot. For the sake of clearness, such usual appurtenances and accessories as arc electrode supports and connections, and the means for oscillating or rocking the furnace are omitted, it being understood that such may be of any known or other suitable form. The present invention takes advantage of the rocking action of the furnace by substituting for the usual removable door at the feed opening a furnace loading hopper 37 to be periodically moved into the loading position in the rocking movement of the furnace. Such rocking movement is also taken advantage of by the provision of a control cam 38 mounted thereon for synchronizing certain operations of the system with the rocking movement of the furnace as will hereinafter appear.

Working in proper timed relation with the operations of the furnace is the pre-treating portion of the system shown at the top of Figures 1 and 2 and comprising the apparatus for pretreating and feeding the borings to the furnace loading hopper. This portion of the system comprises an elongated kiln or the like 14 mounted above the furnace on suitable structural framework 15 and arranged to enclose an inclined feeding hearth or trough element 16 extending into the kiln through an opening at the end. The trough element 16 is supported at the outer end by an extension 17 hung on a rod 18 resiliently supported from a transverse beam 19 through a suitable resilient member 20, such as a spring or rubber cylinder. The trough or hearth 16 is supported at its lower end by means of a transverse supporting bar 21 extending through the side walls of the retort and supported on the outside thereof by suspension rods 22 suspended from a cross beam 23 in a manner to permit longitudinal and vertical vibratory movement of the hearth. Mounted upon the upper end of the extension 17 at the outer end of the trough 16 is a primary loading hopper 24 arranged to discharge into the upper end of the trough 16 through a discharge aperture 25 whose area is controlled by an adjustable slide door 26 for regulating the rate of feed therethrough. The trough 16 and hopper 24 thus mounted in common are arranged to be vibrated together by suitable air operated vibrators 27 and 28 mounted at opposite ends of the trough and its extension 17. It is to be understood, of course, that the vibrators are to be operated to produce vibration of the trough in a manner to agitate and feed the borings downwardly therealong in a manner well understood in the art. Mounted at the lefthand end of the kiln 14 is a burner 29 such as an oil or gas burner arranged as shown to direct a flame over and along the trough or hearth 16 in a direction in counter-flow of the downward feed movement of the borings and toward an exhaust flue 30 communicating with the interior of the retort near the upper end of the feed trough 16.

An outlet hopper 31 is arranged at the lower end of the trough 16 to receive the borings discharged therefrom and conduct them out of the kiln through a vertical chute 32 leading to a secondary hopper 33 terminating in a short straight sided chute 34 forming a temporary or intermittent storage chamber. The bottom opening of the chute 34 is controlled by a slide valve 35 operated by means of a pneumatic motor cylinder 36' controlled through a slide valve 37' operated by a cam 38' mounted upon and movable with the rocking furnace 10. The lower straight chute element 34 is surrounded by a secondary hopper 36 arranged to guide the discharge into the furnace loading hopper 37, when the latter is in the loading position as shown. The sides and bottom of the furnace loading hopper 37 are designed to terminate in a narrow slot-like opening 38 through the refractory block 39 on the back of the door frame 40. This aperture may be of a size one inch wide by six inches long in transverse cross section, and is set at such an angle as to permit the borings when discharged from the bottom of the chute 34 to fall directly through the slot into the furnace, when the furnace is in the loading position as shown.

In operation, assuming the furnace to contain substantially a full charge of molten metal derived from previously melted borings, and being rocked in its full angle at 120 cycles per hour corresponding to two complete cycles per minute and assuming that the burner 29 is in operation and the trough 16 and hopper 24 are being vibrated to feed the borings from the hopper onto and downwardly along the trough or hearth 16, the furnace loading hopper 37 will pass directly under the secondary hopper four times a minute, that is twice in each complete rocking cycle of the furnace. Each time the receiving hopper 37 passes under the chute 34 and secondary hopper 36, the cam 38' on the drum engages the plunger of the control valve 37' operating the valve in a manner to cause the motor cylinder 36' to open the slide valve 35, the cam 38' moving out of engagement with the valve 37' to permit closure of the slide valve 35 upon movement of the feed hopper 37 from under the secondary hopper 36.

The wet borings passing from the primary loading hopper 24 onto the trough 16 at a given rate of feed determined by the regulation of the adjustable gate 26 in accordance with the requirements of the furnace, are agitated and fed downwardly along the trough 16 by the vibratory movement of the latter in counterflow to the flame from the burner 29. During the passage of the borings down the inclined hearth or trough, they are heated sufficiently at the entrance end of the trough to drive off the water in the form of vapor which is carried off through the exhaust stack 30. Upon further downward traversing of the trough the borings are heated to an elevated temperature say in the neighborhood of 600 to 800 degrees Fahrenheit, at which temperature the cutting oils are volatilized and after proper mixture with the furnace atmosphere are burned. The combined heat furnished by the burner and the combustion of the oils operates to further completely remove the oil and all free carbonaceous materials or other residues leaving the borings in a clean and well superheated condition. To insure freedom from oxidation, the burner and atmospheric condition of the kiln 12 may be controlled in any known or other suitable manner to produce a reducing flame. Such a reducing flame would permit the processing of dry borings without diminishing their carbon content. The clean superheated borings now passing down through the chute 32 are at intervals stored in and discharged from the straight sided temporary storage chamber 34 in synchronism with the operation of the furnace. With a furnace having a rocking periodicity of four per minute and a capacity of say 5,000 pounds of metal per hour, 5,000 pounds of borings would be passed through the pre-treating retort 14, per hour. The borings would thus be introduced into the furnace at regular intervals of four per minute in an amount slightly less than 21 pounds at each opening of the slide valve 35. If the furnace has a holding capacity of 8,000 pounds of molten metal when fully charged, and if we pour from the furnace not more than 5,000 pounds leaving a net balance of not less than 3,000 pounds of molten metal in the furnace during all periods of regular operation, the addition of 21 pounds of preheated borings at a time will represent but a small fraction of the heat capacity of the bath.

Let us assume that the temperature of the bath is maintained substantially uniformly at that required for pouring which, for example, may be in the neighborhood of 2,700 degrees Fahrenheit. We may further assume that the borings will be discharged through the feed hopper 37 at a temperature in the neighborhood of 800 degrees Fahrenheit. Such being the condition, the 20 pounds of borings dropped in four times a minute will pass into the molten condition with great rapidity. This melting is, in fact, so rapid that the borings are only visible as such on the top of the bath for a few seconds. In practice, I have poured molten metal at 2,700 degrees fifteen seconds after the charge had been discontinued without there remaining any sign of borings on the surface of the bath. By the use of the present system the normal melting capacity of the furnace equipment has been greatly increased. In the case of a small experimental unit now in operation such capacity is in excess of 200%.

Co-incident with this increase in capacity, I find a greatly diminished electrical consumption for a given volume of molten metal produced and a greatly reduced electrode consumption, the latter being reduced from eight pounds of electrode per ton of metal to less than five pounds of electrode per ton of metal. Metallurgically, the cast iron is believed to be the equal or better than that produced in a cupola furnace with high cost material such as pig iron, and automotive, agricultural, and steel scrap.

Referring now to Figures 3 and 4 where a direct arc furnace of the multi-phase type is used, the borings will be dropped into the furnace 41 through a tube 42 of Sillimanite or other high refractory material extending to a controlled distance within the furnace. The stream of borings is thus enclosed to prevent their being thrown against the electrodes and to prevent the formation of a cloud of metallic dust which would envelop the electrodes and perhaps cause short circuits. Thus the borings will enter the bath at the middle of the upper portion between the arcs which ordinarily is the hottest portion of the bath and consequently that portion which usually produces the most damaging radiations to the walls and the roof of the furnace. It is believed that by the introduction of the relatively cool borings at this point the usual direction of bath circulation will be reversed. It is believed that the bath in such a furnace as ordinarily used superheats in the center and flows outwardly until the superheated metal comes in contact with the refractory walls of the furnace causing damage at the points of contact between the superheated metal and the refractory lining. According to my method of operation the portion which ordinarily would be superheated becomes that portion of the bath which is operated at the lowest temperature due to introduction of the relatively cool material at this point. Such being the case, it is to be expected that the bath will flow downwardly at the center and be replaced at the center by metal flowing inwardly from the outer upper areas of the bath carrying with it the portions adjacent to the arcs. Such downward circulation will thus cause a circulation upward at the outer edges and toward the center of the liquid pool. In the use of the direct arc furnace as above described, it is thus possible and preferable that a continuous uniform feed of the borings to the furnace be maintained, and interrupted if at all only for pouring.

I have found, however, that by discharging the borings into the furnace in such a manner as to direct them against the heated electrodes, reduced electrical current consumption per ton of metal produced will be experienced due to a reduction of electrode temperature, and where the slight additional electrode consumption is caused by the combination of the carbon of the electrodes with the molten iron it is not objectionable or may even be desired from a metallurgical standpoint and considerable increased economy may be obtained. Such a procedure will also effect a saving of refractories and increase the life of the furnace roof and side walls. Experimentally, I have determined in the case of indirect arc type furnaces as disclosed in the drawings that a certain portion of the borings may be stored up in the hopper in the loading position as shown and that on oscillating, these borings will be gently rained down over the electrodes and that by so doing a very large reduction in electrical energy consumed was experienced. That the increase of electrodes consumed only amounted to about one pound per ton whereas the kilowatt hours consumed was reduced in the order of 25 to 75 kilowatt hours per ton.

I have found that it is desirable to be able to add during the processing of the borings through the system, additional material such as graphite, coke or the like to bring the carbon analysis of the iron up to a desired value, and that it is necessary in so doing that the coke or graphite should be added at a uniform rate so as to combine with the incoming borings in the furnace in such a manner as to produce the desired results. To that end and where the kiln is operated with a reducing atmosphere, the coke or graphite may be added continuously as a fine stream into the hopper 24 so as to blend uniformly with the borings. Under such a process molten iron of the desired analysis may be withdrawn from the electric furnace continuously or intermittently. It will be understood that suitable additional feeding devices may be provided to supply silicon or other alloying metals. These alloy additions may be shot into the boring stream through hopper 24 or an additional hopper may be provided to discharge directly into hopper 31.

The present method is also applicable to the melting of borings which are neither wetted with water or oil or where due to prolonged exposure to the weather the water and oil have been dried off and the borings have become oxidized. Such oxidized borings may be successfully processed according to the present method by the addition of a suitable amount of coke or graphite as above described. By the use of this method, embodying as it does the function of a semi-continuous or continuous charging of both borings, reducing elements and alloying metals (coke, silicon, and the like), I am able to reduce the metallic oxides back to metallic iron without any marked increase in the cost of melting and conversion. Heretofore, it has been very difficult to obtain such results on a production scale through the use of an electric furnace or other equipment, especially when working with highly oxidized borings.

While for the sake of definite disclosure I have herein described certain preferred procedures for the carrying out of my improved process, it is to be understood that the invention is not limited to such specific procedures but contemplates all such variations and modifications thereof as fall fairly within the scope of the appended claims.

This case is a division of co-pending application Serial No. 158,009, filed August 9, 1937, now Patent No. 2,247,823, July 1, 1941.

What is claimed is:

1. The method of heating borings prior to their delivery to a melting furnace which comprises moving the borings longitudinally down an incline, directing a flame at a small acute angle up said incline and redirecting hot gases longitudinally toward said incline after rising therefrom.

2. The method of heating borings prior to their delivery to a melting furnace which comprises moving a layer of the borings along a trough by gravity and agitation, igniting any combustible material present with said borings by passing a flame over them and in contact with them, directing the products of combustion toward said trough to contact with said borings for a large part of the trough length before they are brought in contact with said flame.

3. The method of heating wet borings which comprises moving a thin layer of borings of substantially uniform depth down an incline, directing a flame upon the borings longitudinally against their movement for drying the same, directing the hot gases rising from the borings after their contact with said flame, longitudinally toward and along said layer for a large part of its length to effect a gradual heating of the borings as they move down the incline.

4. The method of heating wet borings which comprises moving a thin layer of borings down an incline, directing a flame upon the borings longitudinally against their movement, from a point adjacent the base of the incline, and additionally directing heat derived from said flame towards said layer of borings from points progressively closer to the layer, moving up the incline.

5. The method of heating wet borings which comprises moving a thin layer of borings down an incline, directing a flame upon the borings longitudinally against their movement from a point adjacent the base of the incline, and additionally converging heat derived from said flame along said layer to the upper limit of the incline.

6. The method of heating wet borings which comprises moving a thin layer of borings down an incline, directing a flame upon the borings longitudinally against their movement from a point adjacent the base of the incline and additionally uniformly and continuously converging heat derived from said flame along said layer to the upper limit of the incline.

7. The method of heating borings prior to delivery to a melting furnace which comprises moving the borings longitudinally down an incline, directing a flame up said incline, and redirecting hot gases longitudinally towards said incline after rising therefrom, along the full length thereof.

HOWARD E. SOMES.